Figure 2:
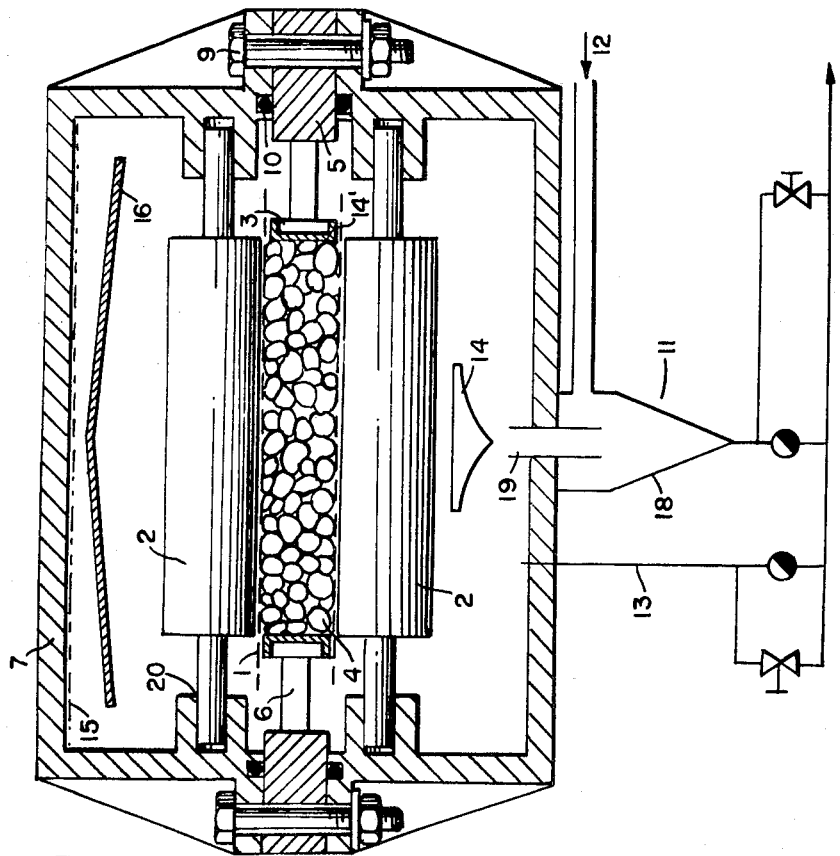

United States Patent [19]
Wick et al.

[11] 3,736,082
[45] May 29, 1973

[54] STEAM CHAMBER

[75] Inventors: Kurt Wick, Frankenthal; Norbert Holl, Ludwigshafen, both of Germany

[73] Assignee: Badische Anilin- & Soda-Farbik Aktiengesellschaft, Ludwigshafen/Rhine, Germany

[22] Filed: Nov. 26, 1971

[21] Appl. No.: 202,077

[52] U.S. Cl. ................... 425/4 C, 425/86, 425/371
[51] Int. Cl. ............................................. B29d 27/04
[58] Field of Search .................. 425/4 C, 86, 371, 425/817 C

[56] References Cited
UNITED STATES PATENTS

| | | | |
|---|---|---|---|
| 1,906,042 | 4/1933 | Barthelemy | 425/86 X |
| 2,250,697 | 7/1941 | Bassett | 425/86 X |
| 3,274,643 | 9/1966 | Oxel | 425/817 C X |
| 3,535,407 | 10/1970 | Pike | 425/86 X |

*Primary Examiner*—H. A. Kilby, Jr.
*Attorney*—Johnston, Root, O'Keeffe, Keil, Thompson & Shurtleff

[57] ABSTRACT

The steam chamber in an apparatus for the continuous manufacture of foamed polystyrene strands has perforated conveyor belts which are guided by rolls and which form, together with foam guides, a channel for the accommodation of particulate polystyrene which has been preformed but is capable of further expansion and which are positively and sealingly connected, via spacing strips, to two housing parts which encompass said channel.

5 Claims, 2 Drawing Figures

STEAM CHAMBER

This invention relates to a stream chamber in an apparatus for the continuous manufacture of foamed polystyrene strands.

In a known apparatus for shaping a coherent foamed article from expandable particles of plastics material (German Pat. No. 1,160,604), the particles of plastics material are passed between perforated steel bands guided by rolls to a chamber containing steam. The steam passes through the bands and the spaces between the particles of plastics material, which are thereby heated and expand to form the coherent foamed article.

However, when perforated steel bands are subjected to varying mechanical and thermal stresses, they tend to corrugate, particularly at the edges. Such corrugations increase the steam losses and thus lead to a rise in energy costs. Furthermore, the quality of fusion in the resulting foams varies, particularly at the edges. Another drawback is the lower foaming rate caused by the steam pressure loss. On account of the different steam pressures in the opposing steam chambers, that side of the foamed article which is exposed to the higher pressure forms a convex surface. The requirement of symmetrical steam pressure, i.e., equal steam pressure in each zone, also cannot be satisfied, as the rates of steam flow to the upper and lower chambers are independently controlles. Finally, the presence of moisture in the foam results in long cooling times, since it is necessary to remove the additional heat of the condensate, and decelerates the fall in pressure in the foam, which is a deciding factor in determining the speed of the bands and thus the output of the apparatus.

We have now devised a steam chamber which does not show these drawbacks and which is characterized, according to the invention, by perforated conveyor belts which are guided between rolls and which form, together with foam guides, a channel for the accommodation of particulate polystyrene which has been preformed but is capable of further expansion; spacing strips which are welded to said foam guides via connecting pieces; and two housing parts which are positively and sealingly connected to said spacing strips by means of bolts and sealing elements, one of which housing parts has means for the introduction of steam and a condensate drain.

In a particularly advantageous embodiment of the steam chamber, the foam guides are covered with a polytetrafluoroethylene film and the joint between the conveyor belts and the housing parts if sealed by metallic lips.

In another advantageous embodiment the steam is deflected and distributed by a baffle, and the condensate forming in the upper half of the steam chamber is deflected by a guide plate.

Figure 1:
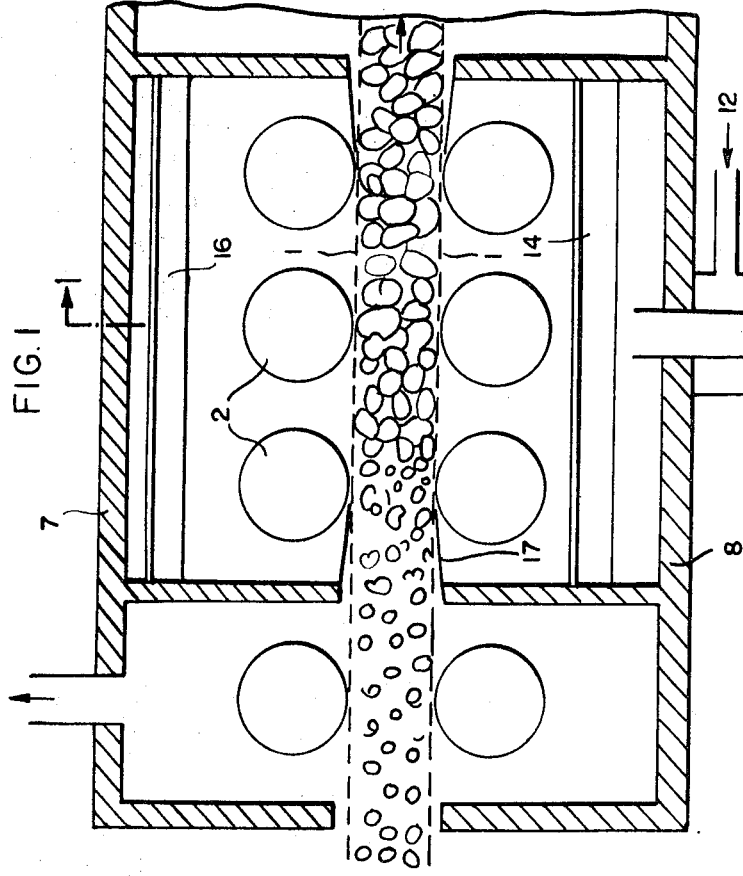

An embodiment is shown by way of example in the accompanying FIGS. 1 and 2, which give diagrammatically, an overall picture of the functions of the individual elements in the steam chamber of the invention. In the drawings FIG. 1 is a side elevation and FIG. 2 is a cross-section through the steam chamber taken in the plane I — I of FIG. 1.

With reference to FIG. 2, the steam 12 passes through a water separator 18, for example a cyclone, and through a short rising tube 19 to the lower steam chamber. A baffle 14 distributes the current of steam and prevents a direct flow of steam onto the particles of plastics material through the perforated conveyor belt 1. The prefoamed plastics particles are transported into and through the steam chamber of the invention in a conventional manner between two perfoated steel conveyor belts 1. The flow of steam is symmetrical about the vertical axis, the steam passing through overflow ducts (not shown) in the connecting pieces 6 between foam guides 3 and spacing strips 5 to the upper steam chamber.

The foam guides 3 are conveniently covered with polytetrafluoroethylene film 14' and these guides form together with the perforated conveyor belts 1, a channel 4 for the accommodation of particulate polystyrene which has been preformed but is capable of further expansion.

Bolts 9 and sealing elements 10 serve to effect a positive and sealing connection between the two housing parts 7 and 8 and the spacing strips 5. If desired, this connection may be effected using quick-action clusire means. Different interchangeable elements comprising foam guides 3, spacing strips 5 and connecting pieces 6 are used for the various thicknesses and foamed polystyrene strands required. The sealing elements 10, which are preferably in the form of strips of round cross-section, provide efficient static sealing along the steam chamber. The expansion pressure of the foaming polystyrene is substantially compensated for by the steam pressure. The relatively small excess pressure in the foam is absorbed by rolls 2 which serve to guide the conveyor belts 1 and which are rotatably mounted in the housing parts 7 and 8 in bushes 20 of sintered metal, which may have graphite incorporated in it.

The condensate 15 forming in the upper half of the steam chamber due to heat losses is guided to the side by a guide plate 16 and is removed from the lower half of the steam chamber through a condensate drain 13.

Sealing between the conveyor belts 1 and the housing parts 7 and 8 is effected with lip seals 17 consisting of aprons of copper or copper alloys (FIG. 1). To effect sealing at the ends of the steam chamber perpendicular to the direction of transport metallic lip seals are also used, these being mechanically prevented from bending back.

The measure of bolting the housing parts to the interchangeable elements provides an efficient static seal. Energy losses are negligibly small.

With the above described steam feed, only one pressure regulator is necessary. A separate steam feed to the upper half of the chamber is dispensed with, which separate feed would have had to be effected through flexible lines due to the various thicknesses of foamed polystyrene required.

Since the upper and lower halves of the steam chamber communicate through overflow ducts to form a single closed chamber, the particles of plastics material are uniformly heated. It is thus impossible for the foam to undergo convex deformation due to asymmetrical heating.

The steam pressure inside and outside the foaming channel is always the same, this leading to a uniform high quality of the foamed polystyrene strands over their entire cross-section.

We claim:

1. A steam chamber in an appratus for the continuous manufacture of foamed polystyrene webs, comprising the combination of the following features:
   perforated conveyor belts which are guided between rolls and which form, together with foam guides, a channel for the accommodation of particulate polystyrene which has been prefoamed but is capable of further expansion;
   spacing strips which are welded to said foam guides via connecting pieces; and
   two housing parts which are positively and sealingly connected to said spacing strips by means of bolts and sealing elements, one of which housing parts has means for the introduction of steam and a condensate drain.

2. A steam chamber as claimed in claim 1, wherein the foam guides are covered with a polytetrafluoroethylene film.

3. A steam chamber as claimed in claim 1, wherein the steam is deflected and distributed by a baffle.

4. A steam chamber as claimed in claim 1, wherein the condensate forming in the upper half of the steam chamber is deflected by a guide plate.

5. A steam chamber as claimed in claim 1, wherein the seal between the conveyor belts and the housing parts is provided by metallic lip seals.

* * * * *

PO-1050
(5/69)

UNITED STATES PATENT OFFICE
CERTIFICATE OF CORRECTION

Patent No. 3,736,082      Dated May 29, 1973

Inventor(s) Kurt Wick and Norbert Holl

It is certified that error appears in the above-identified patent and that said Letters Patent are hereby corrected as shown below:

First page, left-hand column, fifth line, "Soda-Farbik" should read -- Soda-Fabrik --; tenth line, insert
-- [30]      Foreign Application Priority Data
     December 1, 1970    Germany . . . . . P 20 59 036.7 --.

Column 1, line 2, "stream chamber" should read -- steam chamber --; line 28, "controlles" should read -- controlled --; line 51, "if sealed" should read -- is sealed --; line 58, "give" should read -- give, --.

Column 2, line 21, "clusire" should read -- closure --.

Column 3, line 1, claim 1, "appratus" should read -- apparatus --.

Signed and sealed this 27th day of November 1973.

(SEAL)
Attest:

EDWARD M. FLETCHER, JR.          RENE D. TEGTMEYER
Attesting Officer                    Acting Commissioner of Patents